United States Patent
Gundavelli et al.

(10) Patent No.: US 12,133,291 B2
(45) Date of Patent: Oct. 29, 2024

(54) ON-BOARDING 5G ROUTERS TO PRIVATE 5G NETWORK

(71) Applicant: Cisco Technology, Inc., San Jose, CA (US)

(72) Inventors: Sri Gundavelli, San Jose, CA (US); Timothy P. Stammers, Raleigh, NC (US); Eren Kudsi Gonen, Saratoga, CA (US); Bobby Wayne Hoosang Richardson, Torrance, CA (US)

(73) Assignee: Cisco Technology, Inc., San Jose, CA (US)

( * ) Notice: Subject to any disclaimer, the term of this patent is extended or adjusted under 35 U.S.C. 154(b) by 482 days.

(21) Appl. No.: 17/576,595

(22) Filed: Jan. 14, 2022

(65) Prior Publication Data
US 2023/0232216 A1    Jul. 20, 2023

(51) Int. Cl.
*H04W 12/06* (2021.01)
*H04L 61/4511* (2022.01)
*H04W 8/18* (2009.01)
*H04W 8/26* (2009.01)
*H04W 84/04* (2009.01)

(52) U.S. Cl.
CPC ......... *H04W 8/265* (2013.01); *H04L 61/4511* (2022.05); *H04W 8/183* (2013.01); *H04W 12/06* (2013.01); *H04W 84/042* (2013.01)

(58) Field of Classification Search
CPC ..... H04W 8/265; H04W 8/183; H04W 12/06; H04W 84/042; H04L 61/4511
See application file for complete search history.

(56) References Cited

U.S. PATENT DOCUMENTS

| | | | |
|---|---|---|---|
| 2020/0275273 A1* | 8/2020 | Smith | H04W 12/50 |
| 2020/0288300 A1 | 9/2020 | Oswal et al. | |
| 2020/0359212 A1 | 11/2020 | Chen et al. | |
| 2020/0366737 A1* | 11/2020 | Florit | H04W 4/18 |
| 2020/0374839 A1 | 11/2020 | Novian et al. | |
| 2021/0112413 A1 | 4/2021 | Pazhyannur | |
| 2021/0377722 A1* | 12/2021 | Fan | H04W 8/205 |
| 2022/0070649 A1* | 3/2022 | Sahin | H04L 65/1073 |
| 2024/0031805 A1* | 1/2024 | Ståhl | H04W 4/60 |

FOREIGN PATENT DOCUMENTS

WO   2021163870   8/2021

* cited by examiner

Primary Examiner — Rafael Perez-Gutierrez
Assistant Examiner — Gilbert M Grant
(74) Attorney, Agent, or Firm — Polsinelli P.C.

(57) ABSTRACT

Systems, methods, and computer-readable media are provided for on-boarding network devices onto a private 5G network. An example method can include discovering a first private 5G network upon the network device being turned on, authenticating, at the network device, the network device, downloading a second network profile from an SM-DP+ server of a second private 5G network, and on-boarding the network device to the second private 5G network.

20 Claims, 6 Drawing Sheets

ON-BOARDING 5G ROUTERS TO PRIVATE 5G NETWORK

DESCRIPTION OF THE RELATED TECHNOLOGY

The present technology pertains to on-boarding routers to 5G networks and more particularly to a non-operator centric approach for on-boarding routers to private 5G networks.

BACKGROUND

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

In some scenarios, these 5G networks may be private 5G networks. Currently, 5G networks utilize a mobile network operator (MNO) or a mobile virtual network operator (MVNO) that is used for network connectivity and eSIM management services. Routers purchased for this purpose are shipped with the respective MNO/MVNO's SIM card, such that any future SIM management services need to be through the operator who shares those SIM credentials. However, this model may not work for private 5G deployments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In one aspect, a method of on-boarding a network device to a 5G network can include discovering a first private 5G network upon the network device being turned on, authenticating, at the network device, the network device over the first private 5G network, upon successful authentication of the network device over the first private 5G network, downloading a second network profile of a second private 5G network from a Subscription Management-Data Preparation (SM-DP)+ sever, and on-boarding the network device to the second private 5G network.

In another aspect, the network device is pre-configured with a first network profile and associated credentials corresponding to the first private 5G network.

In another aspect, authenticating the network device includes determining whether a Public Land Mobile Network ID (PLMNID) included in the first network profile matches a PLMNID of the first private 5G network.

In another aspect, the method can also include disabling the first network profile.

In another aspect, the method can also include performing, by the network device, a Domain Name Server (DNS) Resolution on a fully qualified domain name (FQDN) of the SM-DP+ server to find an Internet Protocol (IP) address of the SM-DP+ server.

In another aspect, on-boarding the network device to the second private 5G network includes receiving the second network profile and associated credentials for the second private 5G network from the SM-DP+ server.

In another aspect, on-boarding the network device to the second private 5G network includes sending the associated credentials for the second private 5G network to an ISE/UDM component of the second private 5G network.

In one aspect, a network device can include a transceiver, a processor configured to execute instructions and cause the processor to discover a first private 5G network upon the network device be turned on, authenticate, at the network device, the network device over the first private 5G network, upon successful authentication of the network device over the first private 5G network, download a second network profile of a second private 5G network from a Subscription Management-Data Preparation (SM-DP)+ server, and on-board the network device on the second private 5G network.

In one aspect, a non-transitory computer-readable storage medium having stored therein instructions which, when executed by a processor, cause the processor to discover a first private 5G network upon the network device be turned on, authenticate, at the network device, the network device over the first private 5G network, upon successful authentication of the network device over the first private 5G network, download a second network profile of a second private 5G network from a Subscription Management-Data Preparation (SM-DP)+ server, and on-board the network device on the second private 5G network.

EXAMPLE EMBODIMENTS

The mobile industry is transitioning from physical Subscriber Identity Module (SIM) cards to Software SIMs. GSMA has defined the eSIM solution, with protocols for downloading SIM profiles to an embedded, programmable SIM card (eUICC) in the device. The Groupe Speciale Mobile Association (GSMA) that represents the interest of mobile operators has a Remote SIM Provisioning architecture that allows provisioning of multiple profiles into Embedded Universal Integrated Circuit Cards (eUICCs) and for the lifecycle management of the profiles. Each profile comprises of the operator data related to a subscription, including the operator's credentials.

As per the workflow defined in GSMA's Remote SIM Provisioning specifications, eSIM profiles are typically owned and managed by the Service Provider. A new device from the manufacturing house comes with a pre-loaded bootstrapping profile, which allows only that specific operator associated with that bootstrapping profile to add/delete new eSIM profiles onto the eUICC. Any time a new eSIM profile needs to be downloaded, the mobile user needs to reach out to the operator and have them securely package the profile and deliver it to the eUICC over Subscription Management-Data Preparation (SM-DP)+ interface. This approach of operator-centric model will work for mobile devices where there is always public network subscription but is not a feasible option for devices that will operate in a private environment (e.g., in a private cellular network).

Telecommunication and networking device manufacturers such as Cisco, Inc. of San Jose, CA, sell 5G routers with cellular-based WAN interfaces. For example, when a customer orders a router with 5G capabilities, the customer must select a mobile network operator (MNO) or a mobile virtual network operator (MVNO), which the customer will use for their network connectivity and eSIM management services. The manufacturer configures the router with the specified MNO and/or MVNO's SIM card and then ships the router to the customer. Any future SIM management services have to be through the operator who shares those SIM credentials.

This model, however, will not work for private 5G network deployments. For example, in some scenarios, the router may be always and only connected to a private 5G network and never connects to a MNO's public network. For example, a mining company may have large mining fields where they operate a private network for connectivity, because there are no public networks in the vicinity. A router in a truck with telemetric equipment can be connected to the private network.

To summarize, current operator centric techniques and approaches for eSIM management are insufficient/inadequate for use in private cellular network environments, for the following reasons.

First, Routers integrate a High Speed Wan Interface Card (HWIC) module for cellular capabilities. The HWIC module has the 5G MODEM, eUICC and a Local Profile Assistant (LPA) agent. The router has no visibility or control on the eUICC device from the router console. For all practical purposes, the 5G module with MODEM and eUICC appears as an external device to the router, leaving no control from the router console to eUICC device. The access to SM-DP+ server has to be through the 5G MODEM, and not through any other network interfaces of the router. As a result, a new router from box has to first connect to a 5G network for it to obtain a new network profile. But, when there is no public network, and/or a subscription to a public network, the router cannot ways to reach the SM-DP+ server.

Second, It is not possible for a device manufacturer to configure a eSIM profile associated with a customer's private network because information on Public Land Mobile Network Identifier (PLMNID) of the customer's private network and/or SIM credentials to be used for that customer, are unknown to the device manufacturer.

Third, there is no trigger for the LPA to reach the SM-DP+ server for a new profile. If there is some form of network connectivity and SMS support, a text message would have acted as a trigger to reach the SM-DP+ for a new profile.

In view of these deficiencies, there is a need for an efficient system and process where the customer can power on the device and be able to on-board the device securely and efficiently to a private network, even in the absence of a public network. This ability to on-board the device to their private network without requiring the eSIM services of a MVNO/MNO is important for enabling 5G WAN router deployments in private networks.

The disclosed technology addresses the need in the art for systems and processes for enabling onboarding of routers onto private 5G networks without requiring eSIM services of a MVNO/MNO. The example approaches and processes described below may be referred to as a non-operator centric and/or zero-touch approach or process for onboarding 5G routers and eSIM management.

Figure 1A:
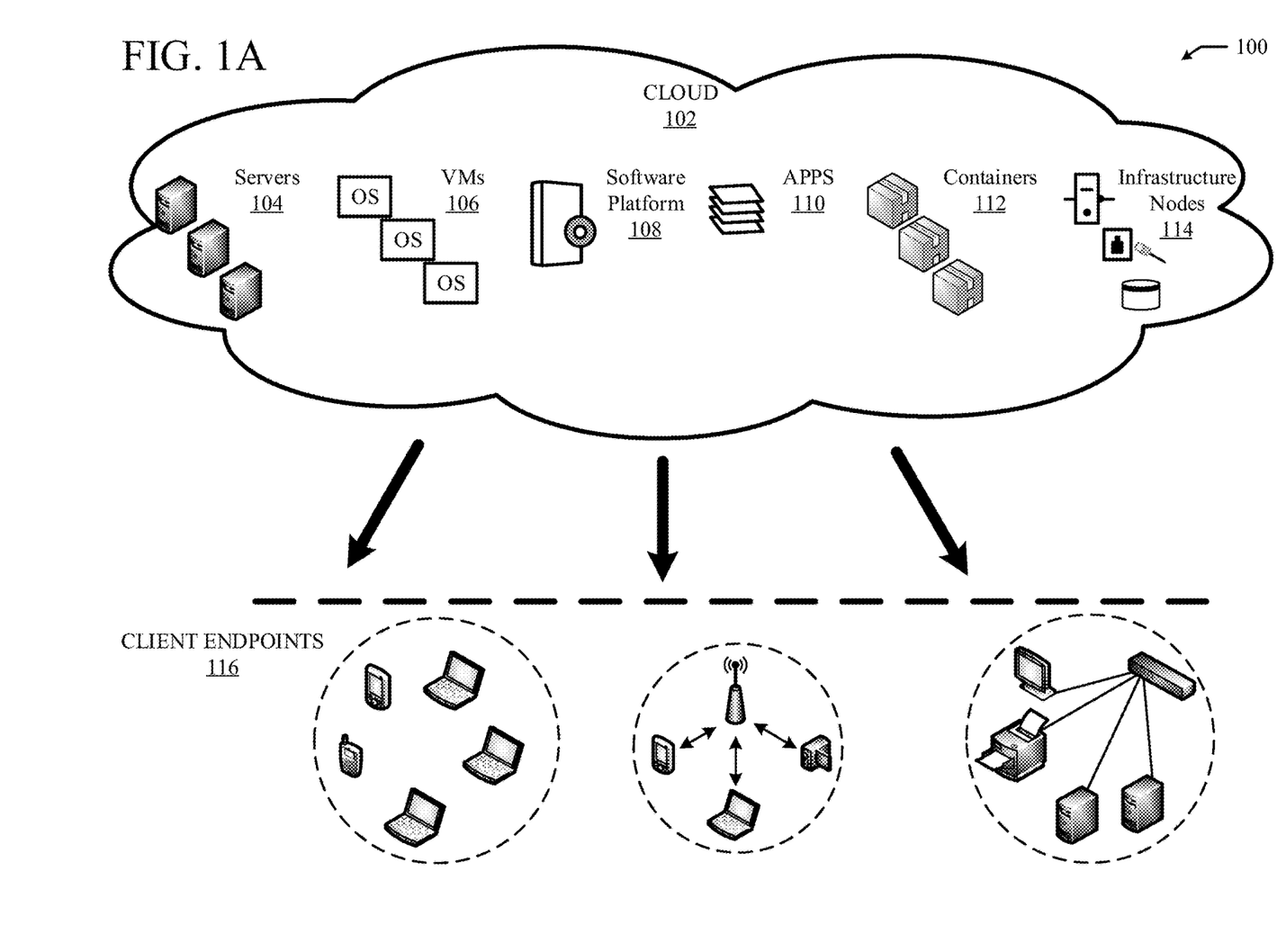
FIG. 1A illustrates an example cloud computing architecture in accordance with some examples of the disclosure.
Figure 1B:
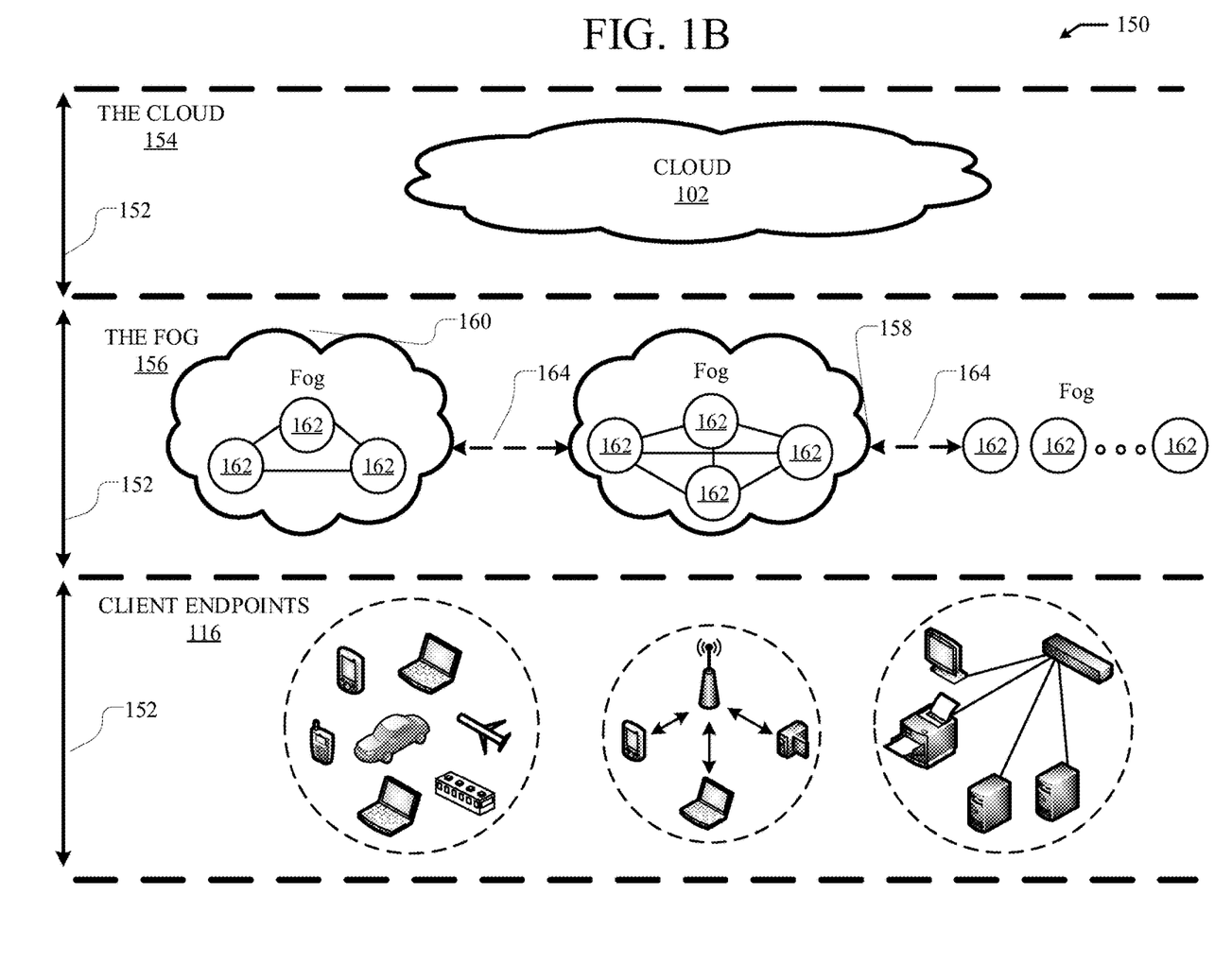
FIG. 1B illustrates an example fog computing architecture in accordance with some examples of the disclosure.
Figure 2:
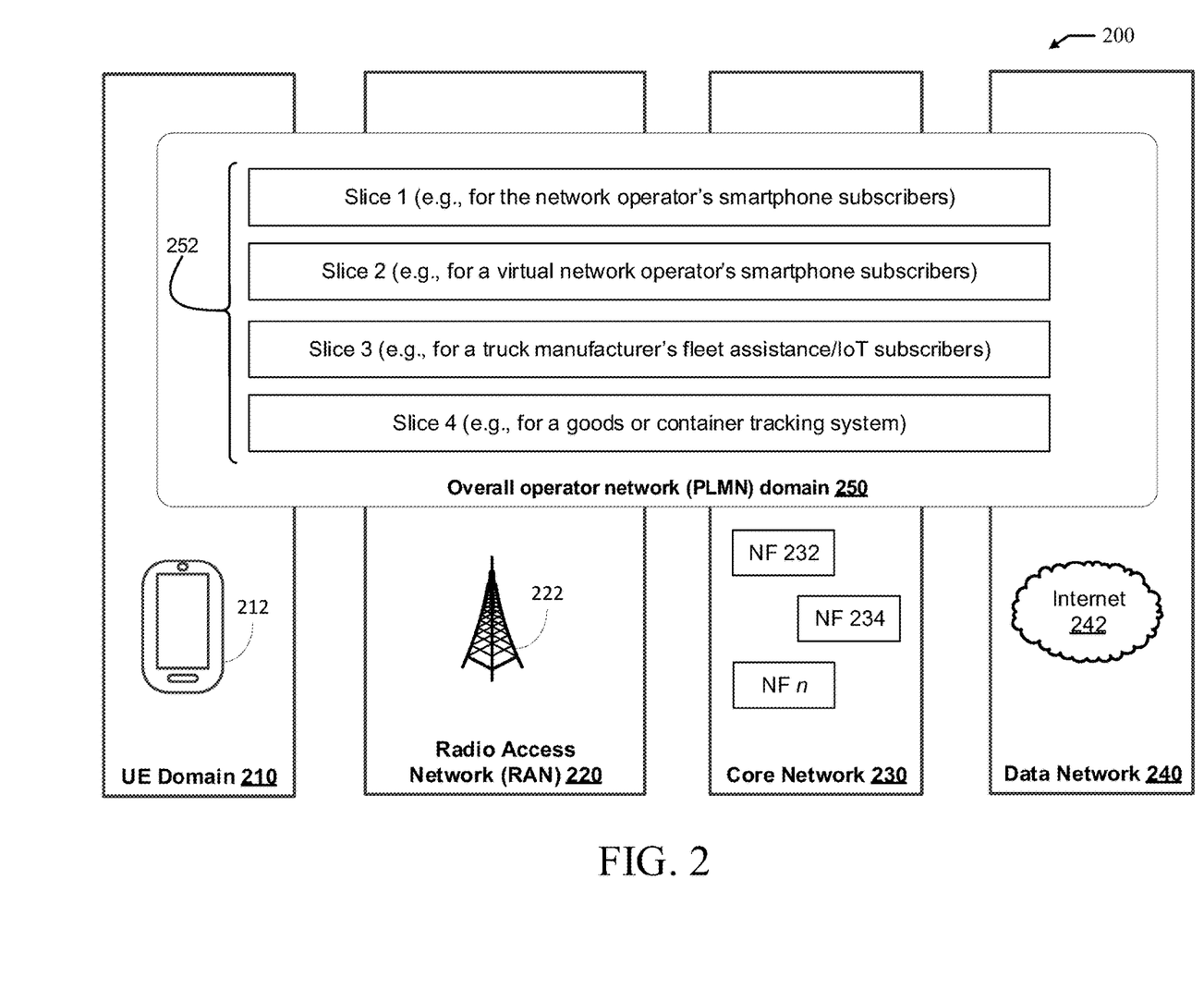
FIG. 2 depicts an exemplary schematic representation of a 5G network environment in which network slicing has been implemented in accordance with some examples of the disclosure.
Figure 3:
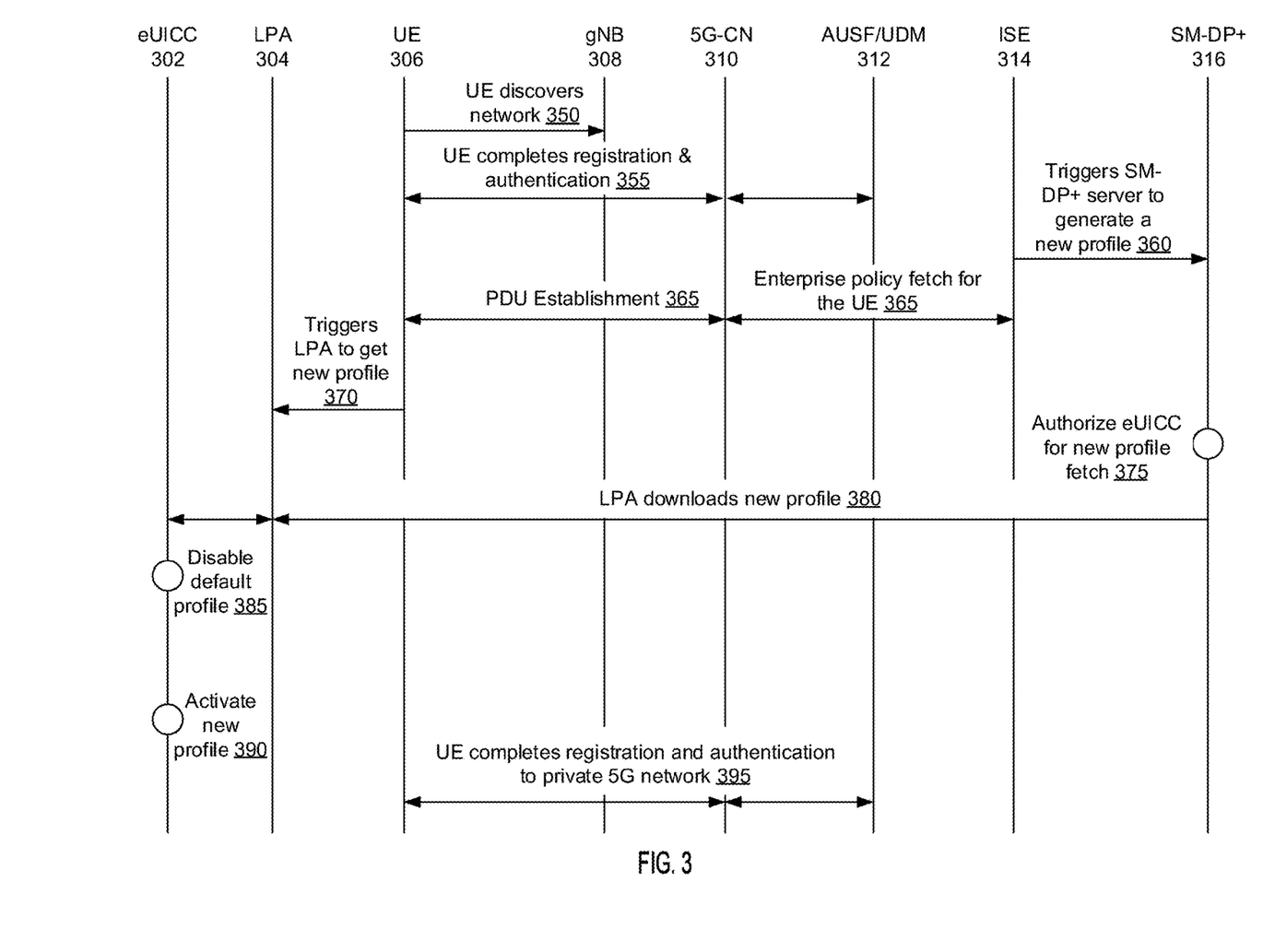
FIG. 3 illustrates a workflow diagram having various modules that enable onboarding network devices to a private 5G network in accordance with some examples of the disclosure.
Figure 4:
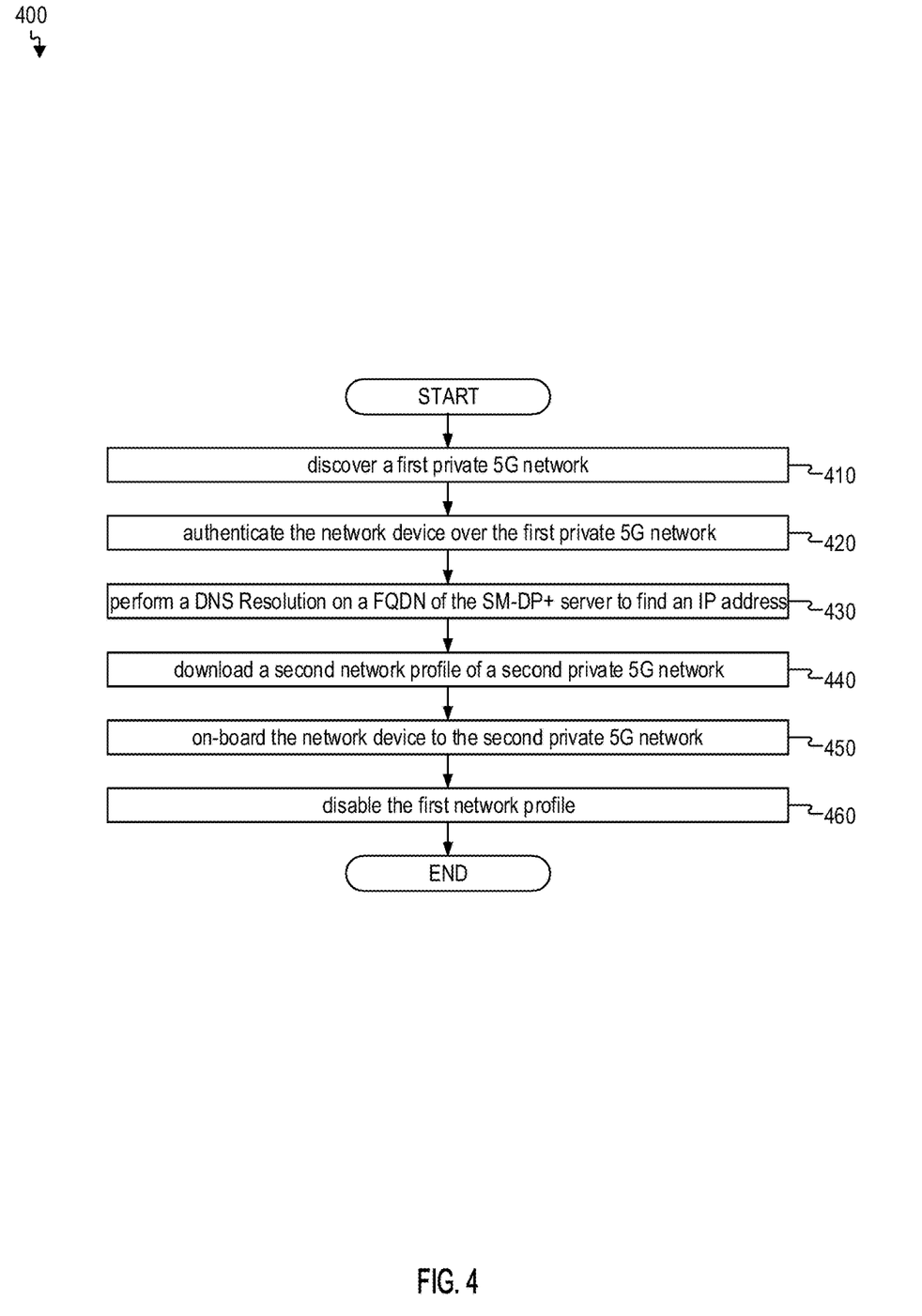
FIG. 4 is a flowchart of a method for on-boarding a network device to a private 5G network in accordance with some examples of the disclosure.

A description of network environments and architectures for network data access and services, as illustrated in FIGS. 1A, 1B, and 2 is first disclosed herein. A discussion of systems, methods, and computer-readable medium for on-boarding network devices to a private 5G network, as shown in FIGS. 3-4, will then follow. The discussion then concludes with a brief description of example devices, as illustrated in 5. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, ..., n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 ... NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

With example network systems and architectures described above with reference to FIGS. 1A, 1B and 2, example embodiments of a non-operator centric and/or zero-touch approach or process for onboarding 5G routers and eSIM management, will be described with reference to FIGS. 3 and 4.

FIG. 3 illustrates a workflow diagram having various modules that enable onboarding network devices to a private 5G network.

FIG. 3 is described with reference to various device and/or network components utilized for providing a non-operator centric/zero-touch approach, each of which is introduced, described with reference to their respective functionalities.

eUICC 302 is configured to store multiple network profiles that can be provisioned and managed. eUICC 302 can also include a default network profile with a PLMN ID that can be registered to a manufacturer of the router. Additionally, eUICC can include a network ID (NID), an international mobile subscriber identity (IMSI), and other parameters generated unique to the router or a group of routers. The default network profile can be an onboarding profile and/or a provisioning profile. Additionally, eUICC 302 can include an eUICC application that is configured to detect a network configured in the default profile and, after successful authentication and PDU creation, trigger a new profile download from a SM-DP+.

LPA 304 is a set of functionalities that provides local control of eUICC 302 to allow for downloading, removing, and/or switching between profiles. LPA 304 can also present local management end user interface to an end user so that the end user can manage the status of profiles on eUICC 302. In some examples, the functions of LPA 304 can be built into eUICC 302.

UE 306 can be any user equipment device including, but not limited to mobile devices, laptops, routers, and/or any other type of known or to be developed connected devices such as client endpoints 116 of FIGS. 1A and 1B, UE 212, etc. UE 306 can include eUICC 302 and LPA 304. For example, a router can include eUICC 302 and LPA 304. In some embodiments, the router can be embedded with a cellular modem and includes eUICC 302, LPA 304, and UE 306 in the form of the modem.

Next Generation NodeB, gNodeB, or gNB 308 is a radio node that allows 5G UEs, such as UE 306, to connect to a 5G core network, such as 5G-Core Network (5G-CN) 310. gNB 308 can be configured to provide 5G user plane and control plane terminations towards UE 306. gNB 308 more broadly may be referred to as base station 308.

5G-CN 310 can be a core network like core network 230 discussed above with respect to FIG. 2. In some embodiments, the onboarding profile for the router is activated based on a select set of gNBs 308. For example, on the slice and/or Data Network Names (DNNs) associated with this PLMNID, security policies could be configured to permit traffic only to SM-DP+.

Authentication Server Function (AUSF) and/or Unified Data Management (UDM) 312 is configured to authenticate UE 306 on 5G-CN 310, storage and management of UE 306 identities, retrieve Access based information or restrictions on a per-user basis, etc.

Identity Service Engine (ISE) 314 is configured to create and enforce security and access policies for devices connected to 5G-CN 310. ISE 314 simplifies identity management across various devices and applications. ISE 314 can be any known or to be developed component configured to implement enterprise policy function.

Subscription Manager Data Preparation Platform (SM-DP+) 316 is responsible for the creation, download, remote management (e.g., enable, disable, update, delete) and the protection of credentials (e.g., profiles).

FIG. 3 additionally illustrates a workflow for onboarding a router onto a private 5G network according to the non-operator centric and zero-touch based techniques of the present disclosure. Although the workflow depicts a particular sequence of operations, the sequence may be altered without departing from the scope of the present disclosure. For example, some of the operations depicted may be performed in parallel or in a different sequence that does not materially affect the function of processes of FIG. 3. In other examples, different components of an example device or system that implements the workflow may perform functions at substantially the same time or in a specific sequence.

A manufacturer can register for a PLMNID to be used for UE 306 on-boarding to private 5G networks. This PLMNID can be used, or a NID space may be carved out from this PLMNI for creating additional private 5G networks under this PLMNID.

UE 306 can be a router with an embedded cellular modem including eUICC 302 and LPA 304 in the form of the modem. While being manufactured, UE 306 can be manufactured to include a default profile with a PLMNID registered to the manufacturer, with a NID, IMSI, and other parameters generated unique to that UE 306 or group of UE 306. In other words, at the time of manufacturing, the manufacturer can provision eUICC 302 with an eSIM profile that is generated for that UE 306. The profile will use the PLMNID registered by the manufacturer and optionally a specific NID in conjunction with the PLMNID, which will serve as a network identifier. A unique set of SIM credentials can be generated for each router or to a batch of routers. At this stage, the only profile that will be active in the router will be this generated profile. Additionally, a manufacturer eUICC application can be installed on a eUICC device. The device may be eUICC 302, LPA 304, and/or a 5G modem where there is visibility of successful authentication of UE 306 to 5G-CN 310. This application can host a simple logic where, on detecting the network configured in the default provisioning profile in eUICC 302, and after a successful authentication and PDU creation, eUICC will trigger a new profile download from SM-DP+ 316.

In some instances, customers can order devices such as UE 306 and select "private use" or "none" when prompted for a carrier option. The manufacturer can then ship UE 306 with provisioned eUICC 302 as described. The customer can then receive the router and the eSIM profile that is stored in the eUICC device. The customer can then on-board the eSIM profile and associated credentials into UDM 312 or home subscriber service (HSS) infrastructure supporting their private 5G network (e.g., 5G-CN 310). In some examples, this process can be automated through an enterprise domain controller, such as Cisco's DNA Center.

To on-board UE 306 onto a private 5G network, a user can activate the default profile (e.g., the on-boarding profile). Additionally, an onboarding profile is activated on a select set of gNBs 308. On the slice/DNNs associated with this PLMNID, a security policy can be enabled such that the security policy only permits traffic to SM-DP+ 316. Thus, one or more gNBs 308 in a staging area will be supporting this private network profile with the provisioning PLMNID.

Therefore, gNBs 308 will be advertising the provisioning PLMNID and optionally an associated NID. The services supported on this PLMNID can be limited. Additionally, any network slices/DNN's associated with this PLMNID will have reachability only to their SM-DP+ server. The purpose of the PLMNID is to reach the SM-DP+ server. In some examples, the private network (e.g., 5G-CN 310) hosting the provisioning network will also host its own private network with its own PLMNID. Furthermore, ISE 314 can facilitate onboarding the router based on default credentials associated with the default profile.

At step 350, UE 306 discovers 5G-CN 310. For example, UE 306 can connect to gNB 308 when UE 306 is connected to the network and turned on. As another more specific example, UE 306 can complete Radio Resource Control (RRC) connection with the provisioning network, with the PLMNID or PLMNID/PID as configured in the profile installed in eUICC 302 as described above.

At step 355, UE 306 is registered on 5G-CN 310 and is authenticated by 5G-CN 310 via AUSF/UDM 312. More specifically, UE 306 is registered on and authenticated by 5G-CN via AUSF/UDM 312 based on the credentials associated with the default profile. Additionally, UE 306 can responsively create a PDU session.

At step 360, ISE 314 triggers SM-DP+ server 316 to generate a new profile. More specifically, after a successful authentication of UE 306 to the provisioning network, the packet core and/or the enterprise policy function will trigger SM-DP+ 316 to generate a new profile package and/or select a predefined profile package for UE 306, either of which are specific to the customer's private network (e.g., 5G-CN 310).

Accordingly, SM-DP+ 316 will generate a new profile for UE 306 and keep the new profile ready for download. SM-DP+ 316 will also on-board the customer's private network credentials to UDM 312 and can additionally configure the policy in the enterprise policy system. The new profile can also include the PLMNID of the private network.

At step 365, the enterprise policy system of 5G-CN 310 can fetch the new profile for UE 306. Additionally, ISE 314 notifies UE 306 to fetch a new profile from SM-DP+ 316. As part of the PDU establishment at step 365, 5G-CN 310 can optionally deliver the IP address or the fully qualified domain name (FQDN) of an address of SM-DP+ 316. The 5G modem can update LPA 304 with the new FQDN/IP address of the SM-DP+ server. Additionally or alternatively, LPA 304 can be configured with a default FQDN associated with an SM-DP+ of the manufacturer. It is further considered that 5G-CN 310 can also trigger LPA 304 to fetch the new profile.

At step 370, UE 306 triggers LPA 304 to get the new profile. In some examples, the successful authentication to 5G-CN 310 can directly result in eUICC activating the application configured in eUICC 302. For example, when a router is attached to the provisioning network matching the PLMNID in the eUICC's default provisioning profile, the router triggers eUICC 302, via LPA 304, to reach SM-DP+ and download a new eSIM profile for the new private network.

At step 375, SM-DP+ 316 authorizes eUICC 302 to fetch the new profile.

At step 380, LPA 304 downloads the new profile. For example, LPA 304 can establish a transport layer security (TLS) connection to SM-DP+ 316 and downloads the new profile over the TLS connection.

At step 385, eUICC 302 disables the default profile. In some examples, if eUICC 302 is unable to obtain a new profile package, eUICC 302 can keep the default eSIM profile active.

At step 390, eUICC 302 activates the new private 5G network profile.

At step 395, UE 306 completes registration onto 5G-CN 310 and is authenticated by 5G-CN 310 via AUSF/UDM 312. For example, on re-attach or reboot, the router will discover the new private network and will complete the authentication to its new network.

FIG. 4 illustrates an example method 400 for on-boarding a router onto a private 5G network. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence. Steps of FIG. 4 will be described from the perspective of UE 306 of FIG. 3.

According to some examples, the method includes discovering a first private 5G network upon the network device being turned on at step 410. For example, the UE 306 illustrated in FIG. 3 may discover a first private 5G network upon the network device be turned on. In some examples, the network device is pre-configured with a first network profile and associated credentials corresponding to the first private 5G network. For example, example process 400 at step 410 may be the same as step 350 described above with reference to FIG. 3.

According to some examples, the method includes authenticating, at the network device, the network device at step 420. For example, the UE 306 illustrated in FIG. 3 may authenticate, at the network device, the network device. In some examples, authenticating the network device includes determining whether a PLMNID included in the first network profile matches a PLMNID of the first private 5G network. For example, example process 400 at step 420 may be the same as step 355 described above with reference to FIG. 3.

According to some examples, the method includes performing, by the network device, a Domain Name Server (DNS) Resolution of a FQDN of the SM-DP+ server to find an Internet Protocol (IP) address of the SM-DP+ server. For example, UE 306 illustrated in FIG. 3 may perform a DNS resolution of the FQDN of the SM-DP+ server to find an IP address of the SM-DP+ server. For example, example process 400 at step 430 may be the same step as 365.

According to some examples, the method includes downloading a second network profile from an SM-DP+ server of a second private 5G network at step 440. For example, the LPA 304 illustrated in FIG. 3 may download a second network profile from an SM-DP+ server of a second private 5G network. In some examples, downloading the second network profile is responsive to determining that a PLMNID in the first network profile matches a PLMNID of the first private 5G network. For example, example process 400 at step 440 may be the same as step 380 described above with reference to FIG. 3.

According to some examples, the method includes on-boarding the network device to the second private 5G network at step 450. For example, the UE 306 illustrated in FIG. 3 may on-board the network device to the second private 5G network. In some examples, on-boarding the network device to the second private 5G network includes receiving the second network profile and associated credentials for the second private 5G network from the SM-DP+ server. In some examples, on-boarding the network device to the second private 5G network includes sending the associated credentials for the second private 5G network to an ISE/UDM component of the second private 5G network. For example, example process 400 at step 450 may be the same as steps 390 and/or 395 described above with reference to FIG. 3.

According to some examples, the method includes disabling the first network profile at step 460. For example, the eUICC 302 illustrated in FIG. 3 may disable the first network profile. For example, example process 400 at step 460 may be the same as step 385 described above with reference to FIG. 3.

Figure 5:
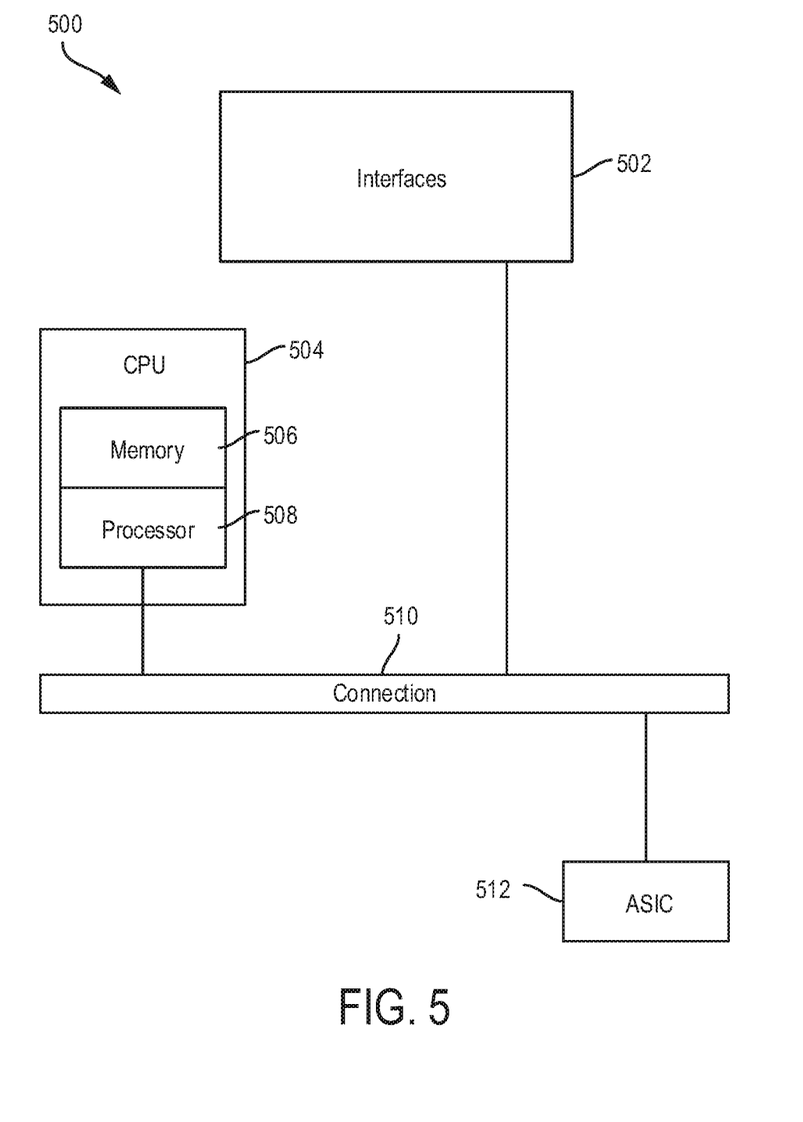
FIG. 5 illustrates an example network device in accordance with some examples of the disclosure.

FIG. 5 illustrates an example network device 500 suitable for performing switching, routing, load balancing, and other networking operations. The example network device 500 can be implemented as switches, routers, nodes, metadata servers, load balancers, client devices, and so forth.

Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 504) to efficiently perform routing computations, network diagnostics, security functions, etc.

Although the system shown in FIG. 5 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

What is claimed is:

1. A method of on-boarding a network device to a 5G network, the method comprising:
   discovering a first private 5G network upon the network device being turned on;
   authenticating, at the network device, the network device over the first private 5G network;
   upon successful authentication of the network device over the first private 5G network, downloading a second network profile of a second private 5G network from a Subscription Management-Data Preparation (SM-DP)+ server; and
   on-boarding the network device to the second private 5G network.

2. The method of claim 1, wherein the network device is pre-configured with a first network profile and associated credentials corresponding to the first private 5G network.

3. The method of claim 2, wherein authenticating the network device includes determining whether a Public Land Mobile Network ID (PLMNID) included in the first network profile matches a PLMNID of the first private 5G network.

4. The method of claim 2, further comprising:
   disabling the first network profile.

5. The method of claim 1, further comprising:
   performing, by the network device, a Domain Name Server (DNS) Resolution on a fully qualified domain name (FQDN) of the SM-DP+ server to find an Internet Protocol (IP) address of the SM-DP+ server.

6. The method of claim 1, wherein on-boarding the network device to the second private 5G network includes receiving the second network profile and associated credentials for the second private 5G network from the SM-DP+ server.

7. The method of claim 1, wherein on-boarding the network device to the second private 5G network includes sending the associated credentials for the second private 5G network to an ISE/UDM component of the second private 5G network.

8. A network device comprising:
   a transceiver;
   a processor configured to execute instructions and cause the processor to:
   discover a first private 5G network upon the network device be turned on, authenticate, at the network device, the network device over the first private 5G network, upon successful authentication of the network device over the first private 5G network, download a second network profile of a second private 5G network from a Subscription Management-Data Preparation (SM-DP)+ server, and on-board the network device to the second private 5G network.

9. The network device of claim 8, the network device is pre-configured with a first network profile and associated credentials corresponding to the first private 5G network.

10. The network device of claim 9, authenticating the network device includes determining whether a Public Land Mobile Network ID (PLMNID) included in the first network profile matches a PLMNID of the first private 5G network.

11. The network device of claim 9, wherein the instructions further cause the processor to:

disable the first network profile.

12. The network device of claim 8, wherein the instructions further cause the processor to:

perform, by the network device, a Domain Name Server (DNS) Resolution on a fully qualified domain name (FQDN) of the SM-DP+ server to find an Internet Protocol (IP) address of the SM-DP+ server.

13. The network device of claim 8, on-boarding the network device to the second private 5G network includes receiving the second network profile and associated credentials for the second private 5G network from the SM-DP+ server.

14. The network device of claim 8, on-boarding the network device to the second private 5G network includes sending the associated credentials for the second private 5G network to an ISE/UDM component of the second private 5G network.

15. A non-transitory computer readable medium comprising instructions, the instructions, when executed by a computing system, cause the computing system to:

discover a first private 5G network upon the network device be turned on;

authenticate, at the network device, the network device over the first private 5G network;

upon successful authentication of the network device over the first private 5G network, download a second network profile of a second private 5G network from a Subscription Management-Data Preparation (SM-DP)+ server; and on-board the network device to the second private 5G network.

16. The computer readable medium of claim 15, the network device is pre-configured with a first network profile and associated credentials corresponding to the first private 5G network.

17. The computer readable medium of claim 16, authenticating the network device includes determining whether a Public Land Mobile Network ID (PLMNID) included in the first network profile matches a PLMNID of the first private 5G network.

18. The computer readable medium of claim 16, wherein the instructions, when executed by the computing system, further cause the computing system to:

disable the first network profile.

19. The computer readable medium of claim 15, wherein the instructions, when executed by the computing system, further cause the computing system to:

perform, by the network device, a Domain Name Server (DNS) Resolution on a fully qualified domain name (FQDN) of the SM-DP+ server to find an Internet Protocol (IP) address of the SM-DP+ server.

20. The computer readable medium of claim 15, on-boarding the network device to the second private 5G network includes receiving the second network profile and associated credentials for the second private 5G network from the SM-DP+ server.

\* \* \* \* \*